United States Patent [19]

Fischer et al.

[11] 4,290,637

[45] Sep. 22, 1981

[54] SEPARATION MECHANISM FOR RELEASING AN AERODYNAMIC BRAKING DEVICE FROM A LOAD

[75] Inventors: Klaus H. Fischer, Troisdorf; Heinz Kroschel, Troisdorf-Sieglar; Heinrich Kolf, Troisdorf, all of Fed. Rep. of Germany

[73] Assignee: Dynamit Nobel Aktiengesellschaft, Troisdorf, Fed. Rep. of Germany

[21] Appl. No.: 63,746

[22] Filed: Aug. 6, 1979

[30] Foreign Application Priority Data

Aug. 5, 1978 [DE] Fed. Rep. of Germany ....... 2834435

[51] Int. Cl.³ .............................................. B64D 17/38
[52] U.S. Cl. ..................................................... 294/83 A
[58] Field of Search ............. 294/83 R, 83 A, 83 AE, 294/84; 24/232 R, 242; 244/151 B

[56] References Cited

U.S. PATENT DOCUMENTS

| | | | |
|---|---|---|---|
| 2,383,485 | 8/1945 | Irby | 294/83 A |
| 2,483,044 | 9/1949 | Gongwer | 294/83 A |
| 2,489,709 | 11/1949 | Hrabal | 294/83 A |
| 2,634,155 | 4/1953 | Frieder et al. | 294/83 A |
| 2,955,867 | 10/1960 | Linthicum | 294/83 A |
| 4,062,581 | 12/1977 | Munscher | 294/83 A |

FOREIGN PATENT DOCUMENTS

521304 3/1955 Italy ................................ 244/151 B

Primary Examiner—Johnny D. Cherry
Attorney, Agent, or Firm—Craig and Antonelli

[57] ABSTRACT

A separation mechanism for detaching an aerodynamic braking device, especially a parachute, from a load with the separation mechanism being adapted to be connected to at least one suspension element of the braking device and the load and, upon relief, being adapted to automatically release at least one of the suspension elements. The separation mechanism is constructed as a closed system and includes at least two holding members movable relative to each other with the holding members forming at least part of an enclosure, closed along its entire periphery, for defining an opening through which the suspension element to be released is extended. The holding members are locked against each other in a closed position of the closed system with the locking mechanism being adapted to be released by stress exerted on the suspension element. The holding members are constructed so that even after a release of the locking mechanism, the suspension element to be released is held under the stress of at least one of the holding members and can be released only after a relief of the stress.

29 Claims, 17 Drawing Figures

SEPARATION MECHANISM FOR RELEASING AN AERODYNAMIC BRAKING DEVICE FROM A LOAD

The present invention relates to a release arrangement and, more particularly, to a separation mechanism for detaching an aerodynamic braking device such as, for example, a parachute, from a load or cargo, wherein the separation mechanism may be connected to at least one suspension element of the braking device and of the load or cargo and, upon relief, automatically releases at least one of the suspension elements.

Loads such as scatter ammunition, especially mines, as well as electronic monitoring instruments, interference devices, or other small cargo which are to be dropped from the air normally require an aerodynamic braking device for reducing the impact velocity of the load on the ground to a tolerable degree. In particular, parachutes are generally employed as an aerodynamic braking device; however, it is also possible to employ other arrangements such as, for example, pockets, ribbons arranged at right angles to the flow direction, strips, or the like which effect a desired deceleration due to the drag.

To prevent entanglement of the braking device when the load strikes the ground and generally rolls to a stop, and also to improve the camouflaging of the load, it has been proposed to arrange a separation mechanism between the braking device and the load with the separation mechanism being adapted to effect separation or release of the braking device immediately upon contact with the ground. Such a separation mechanism may, for example, be directly connected with rigging lines of a parachute or with the suspension lines of the load, or may be joined indirectly to these lines by way of connecting loops, eyes, hooks, or the like. The device for connecting the separation mechanism to the braking device and to the load will be designated hereinbelow quite generally as suspension elements, independently of their respective actual design.

Various constructions of separating mechanisms which become effective to automatically release the suspension element of the load upon impact to the ground have been proposed. However, disadvantages of the proposed separation mechanisms reside in the fact that they are mechanically very complicated and, consequently, also very expensive. Additionally, the proposed mechanisms have a large volume and are impossible to realize in smaller dimensions for smaller cargo.

With separation mechanisms having open hook-shaped constructions and which include a load-dependent ejector adapted to throw the suspension element of the load out of the laterally open hook so as to release the brake from the load, a small structural size is obtained; however, these mechanisms have the disadvantage that they form inherently an open system by virtue of the unilaterally open hook aperture wherein the suspension element to be released is disposed. Thus, a system is provided which does not surround the suspension element to be released on all sides. Consequently, an improper separation can, for example, take place merely by the opening snap during deployment of the parachute if force vectors are present and oriented toward an open side of the hook which, in practical use, cannot always be prevented due to strong initial pendulating motions.

The aim underlying the present invention essentially resides in providing a separation mechanism for detaching an aerodynamic braking device, which mechanism is constructed as a closed system such that release of the aerodynamic braking device is not realized until there is an interruption in the closed system.

In accordance with advantageous features of the present invention, the separation mechanism is constructed as a closed system with at least two holding members movable relative to each other which holding members form at least a part of an enclosure, closed along its entire periphery, for an opening through which the suspension element to be released is extended. The holding members are locked against each other in a closed position of the system with the locking means being adapted to be released by stress exerted on the suspension element. The holding members are constructed so that even after release of the locking means, the suspension element to be released is held under the stress of at least one of the holding members and can be released only after relief of the stress.

By virtue of the above-noted features of the present invention, a closed system mechanism, that is, a mechanism having an opening for receiving at least the suspension element to be released, which opening is surrounded along its entire periphery by a closed enclosure boundary or the like, the suspension element extending through the opening cannot be released before the enclosure has been interrupted along its periphery and, consequently, the system has to be opened. Preferably, the suspension element to be released is that of the load; however, it may also be that of the aerodynamic braking device. It is also possible for both the suspension element and the aerodynamic braking device to be releaseable with a corresponding modification of the system.

Preferably, in accordance with the present invention, the closed system of the separating mechanism is formed by only two holding members which are movable relative to each other with the opening being formed between the two holding members which opening is entirely closed along its periphery. However, it is also possible to provide three or even more holding members for forming the closed enclosure. As holding members bounding the opening of the closed system, it is also possible to optionally employ also the suspension element not to be released, the braking device proper, etc., as will be explained in greater detail hereinbelow.

According to further advantageous features of the present invention, the holding members, adapted to be moved relative to each other, are provided with locking means for maintaining the holding members in the closed position of the system at least until the suspension elements are stressed upon the activation of the braking device by, for example a relatively high opening shock of a parachute. In any event, the holding members are preferably constructed so that, even after an unlocking, the suspension element to be released remains connected with at least one of the holding members as along as it is still under tensile stress. By virtue of the construction of a separating mechanism as a closed system, which is unlocked only in case of a defined load thereon, it is insured that a premature release of the braking device from the load is reliably excluded, that is, separation takes place indeed only when release takes place by impact on the ground.

By virtue of the advantageous embodiments of the present invention, the closed system of the separation mechanism remains preserved until the suspension elements are relieved with the suspension mechanism opening only upon contact with the ground and then only releasing at least one of the suspension elements.

After a release of the locking means, according to the present invention, the holding members are held in their closed position by the stressed suspension element and move relatively to each other into an open position only upon relief of the stress wherein the enclosure of the opening is interrupted along a part of its periphery and the suspension element can be released. Thus, the unlocked holding members are fixed in their closed position directly by the stressed suspension element. However, this fixation which can be eliminated by relief of the stress, can also be effected indirectly by providing that the stressed suspension element presses against the two free ends of the holding members moving apart during an opening motion by way of, for example, a clamping sleeve, clamping bracket, or the like.

The relative movement of the two holding members during an opening of the system may be accomplished, for example, by providing that the holding members are inherently elastic and are elastically deformed in their locked position so that they automatically assume an open position due to their internal stresses after the system has been released. In such a situation, the two holding members can basically also be fashioned of one piece wherein they are pivotable with respect to each other about a point preferably located in their center. However, the relative movement could also take place by, for example, means of mutually repelling magnetic poles mounted to the holding members.

According to the present invention, the holding members can be placed in their open position under the force of a biased or pretensioned spring element arranged between the two holding members with the spring element being preferably constructed as a torsion spring.

The two holding members may overlap with one of their ends and have such a configuration in the overlapping zone that the suspension element contacting these ends under stress in the overlapping zone prevent their relative movement into the open position so that a fixation of the holding members after they have been unlocked can take place by virtue of the frictional force which exists between the mutually overlapping linearly formed free ends of the holding members and the tension-stressed suspension element contacting these ends, which frictional force is higher than the force exerting the opening action.

Preferably, the overlapping ends of the holding members are respectively curved against the pulling direction of the suspension element to be released. Particularly, the overlapping ends may have a circular arc configuration so that holding claws are obtained which are connected, so to speak, in a shape-mating fashion with the tension-stressed suspension element at right angles to a direction of the tensile stress.

The overlapping ends of the holding members may also be provided with a thickness which decreases toward the free ends thereof. By virtue of such a construction, it is possible to make the separation mechanism, in spite of the overlapping, with a thickness which remains practically the same over its entire height. In this connection, the overlapping free ends of the holding members preferably taper continuously toward their outermost rims.

An especially simple construction of the separation mechanism of the present invention can be realized by pivotally mounting the two holding members with respect to each other about a common axle with the holding members forming the enclosure, closed along its entire periphery for a preferably oval opening formed between the holding members. The connection or pivot axis or common axle in the two free ends of the holding members to be moved apart are preferably disposed in opposition to each other.

Additionally, the common axle or pivot axis of the present invention may be fashioned as an eye-shaped bushing or similar connecting member which connects the two holding members with each other and through which the suspension element remaining in connection with the separation mechanism can be extended. Thus, the suspension element which is not to be released can be extended through an additional cutout in one of the holding members or also through the opening of the system formed by the two holding members.

Furthermore, the two holding members may be pivotable with respect to each other above a common axle and one opening may be formed between them on both sides of the axle with enclosures, continuous along their entire peripheries, of these openings being formed by the holding members. The second opening of the separation mechanism can be formed by a corresponding prolongation of the holding members beyond their connection or pivot axis whereby it is possible to attain, in a very simple manner, a complete release of the suspension element of the load as well of the suspension element associated with the braking device. In this connection, the pivot axis is preferably arranged in the center and the two system openings are made to be identical and preferably with mutually overlapping ends of the two holding members.

It is also possible to maintain the at least two holding members in their closed position by, for example, applying a specific glue connection between the two holding members which glue connection becomes unglued if the suspension elements are under a predetermined stress. In this manner, the holding members may be arranged and constructed in such a way that they can move, with the glue connection being separated, from a first position into a second position wherein, however, the system is likewise still in a closed condition.

According to further advantageous features of the present invention, at least one locking element may be provided for holding the two holding members in their closed position with the at least one suspension element being located with respect to the holding members and the locking elements in such a manner that, upon a tensile stress acting thereon, it can be displaced by a predetermined distance relative to the holding members thereby effecting, during this step, the severing of the locking element and/or the detachment thereof from the holding members. By virtue of this arrangement, a shape-mating locked coupling is provided by, for example, means of a shear pin extended through both holding members wherein the two holding members can be urged apart slightly by means of an associated thrust element displaceable by the stressed suspension element by a predetermined distance so as to shear off the shear pin.

The shape-mating lock coupling can also be realized by disposing the locking element at least in part in an opening formed between the holding members and the suspension element can be extended around the locking element so that the suspension element can be displaced with its contact point at the locking element upon the occurrence of tensile stress within the opening.

Furthermore, the locking element may be constructed as a clamping frame or bracket pushed onto the two holding members forming the closed system with the clamping frame or bracket engaging respectively into one lateral recess of the holding members, spanning the opening formed between the holding members, and being separable or detachable by the action of the stressed suspension element.

The locking element may be fashioned as a rip cord and the rip cord may be tensioned between two extensions of the holding members projecting into the opening of the closed system. The extensions may be fashioned as wire eyelets connected with the holding members.

Additionally, in accordance with the present invention, the locking element may be constructed as pins, webs, brackets, clamps, or the like, and be provided with at least one defined intentional breaking zone.

The two extensions of the holding members which project into the opening of the closed system may be fashioned as arms, lugs, pins, or the like, and oppose one another with their free ends within the opening, preferably at a minor spacing, so that the comparatively short rip cord, tautly extended between both ends, can be severed at a predetermined force under the tensile stress by the suspension element after a correspondingly short elongation path which path is adapted to the small displacement capacity of the suspension element in the opening of the system which opening is generally very small.

In accordance with yet additional advantageous features of the present invention, in the closed position of the holding members, the suspension element of the braking device and/or of the load constitutes part of the enclosure of the opening continuous along the entire periphery through which the suspension element of the load and/or braking device to be released is to be extended. By virtue of this arrangement, the principle of a system opening closed along its entire circumference can also be realized by concomitantly employing the suspension element which is not to be released and preferably also the braking device and/or load connected thereto for enclosing the opening of the system.

In such an arrangement, the preferably two holding members thus form merely a part of the opening enclosure. In the closed position the holding members are in contact with each other, preferably with their two free ends by virtue of the interposition of a spring means such as a compressed compression spring. Here again, the holding members are arrested in their closed position preferably by a shape-mating engagement with corresponding locking elements. However, the connection could also be achieved by, for example, gluing the holding members to each other. Likewise, the two holding members are held, even after they have been unlocked, in their closed position preferably by shape-mating engagement until the system is relieved; however, this temporary fixation could also be effected by a frictional connection.

According to the present invention, the two holding members may be maintained in their closed position by at least one locking element occupying a first position with the locking element being movable into a second position under the tensile stress of the suspension element to be released wherein the locking element contacts respectively one free end of the holding members and retains the same, against a force tending to urge them apart, in the closed position until the stress on the suspension element has been relieved.

The locking element may be fashioned as a sleeve, bushing, or the like, and extend over two free ends of the holding members so as to maintain the holding members in a closed position even in the first position in contact with the free ends of the holding members.

The mutually contacting surfaces of the locking element and of the free ends may be curved and/or inclined at least in a partial zone so that a shape-mating connection may be established in the direction of the force urging the ends apart which connection can be released in the second position of the locking element upon relief of the stress of the suspension element by means of such force.

It is also possible in accordance with the present invention, to provide a separation mechanism fashioned as a closed system wherein the suspension elements of the load and of the braking device are preferably passed through the opening of the closed system by being extended, for example, as a loop, ring, eyelet, or the like around the corresponding holding members. By an appropriate arrangement of the locking means in space in relation to the at least one fulcrum of the holding members, it can be insured that, even in the case of vigorous initial pendulating motions, the locking action is not released even if one of the suspension elements should, at that time, be in the marginal zone of the opening of the system where its enclosure will be interrupted after the unlocking action. Thus, the unlocking step and the immediately following movement of the holding members into their open position are executed only if the tensile forces exerted by way of the suspension elements on the separation mechanism are oriented so that, even in the case of an opened system, the suspension elements remain connected to the holding members until relief occurs.

In this connection, it has been proven to be especially advantageous to fashion the enclosure, which is continuous along the periphery, from two preferably circular-arc-curved holding members which are pivotable from the closed position into the open position about a common axis arranged at one of their ends. These holding members have respectively one free end, namely, in opposition to the common axis so that the system opens in the marginal zone opposite to the common axis. At this location, a locking means is also provided which may, for example, be a soldered or glued zone, a shear pin, etc. for connecting the two free ends of the holding members with each other.

In accordance with the present invention, after release of the locking means, at least one of the holding members, under the stress of the suspension element, can be converted into a position wherein the enclosure of the opening is interrupted along a part of its periphery and wherein at least one holding member has a free end around which the suspension element to be released is extended with this free end having such a shape that, when a stress is exerted thereon, it absorbs the tensile force exerted by the suspension element and, upon relief of the stress, can be separated from the suspension element by a relative displacement with respect to this suspension element.

The two curved holding members pivotally arranged with one of their ends on a common axle overlap with their other free ends so as to form the enclosure which is continuous along the entire periphery of the opening. The locking means may be provided in the overlapping zone of the holding members and the common axle and locking means may be arranged at least approximately in mutual opposite positions.

According to the present invention, the relative movement between the suspension element to be released and the end of the holding member holding the suspension element takes place by means of an element connecting two points of this holding member in the manner of a cord which element is elastically deformable by stress on the suspension member in such a way that, upon relief of the stress, it effects a stripping off of the suspension element from the holding member.

Preferably, the free end of the holding member is curved against the pulling direction of the suspension element and the holding member may be of an identical configuration.

With the suspension element to be released being stripped off, cast off, or thrown off after it has been relieved of its load, that is, when the load touches the ground, such stripping off is accomplished by means of the construction of the respective holding members. In this connection, by virtue of the provision of an elastically deformable element which, upon a relief of the stress, returns to its undeformed condition, the return is effected so quickly that the throwing off of the suspension element lopped over its free end occurs in a rapid manner. However, preferably a separate spring element, which can be correspondingly tensioned under load, is provided for the purposes of throwing off the suspension element.

Advantageously, in accordance with the present invention, when the free ends of the holding members are in a curved shape, when the system is opened and a vertical load is applied, the contact point between the suspension element of the load and/or the braking device and the respective holding member is located respectively below or above the respective highest or lowest point of the free end of the respective holding member.

Preferably, the closed separation mechanisms are utilized which are opened only when the load touches the ground and when the resultant relief occurs with such opening taking place especially by means of spring-type elements. In these systems, and also in the case of systems which open already after the unlocking action, the enclosure of the system opening which is continuous along its entire periphery is furthermore formed only by two holding members which are manufactured with an identical configuration so as to achieve an even greater reduction in the manufacturing costs.

The separation mechanism of the present invention arranged, for example, between the suspension lines or cargo halters of the load to be braked and the rigging lines of a parachute, are designed so that they transmit, without undue deformations, the forces occurring when the braking device is deployed, for example, the opening shock during the deployment of a parachute as well as subsequent braking forces. However, during this procedure, the locking means or catches, for example, in the form of wire brackets, rip cords, shear pins, or the like, which are to prevent a premature opening of the separation mechanisms, are released by the forces during the deployment of the braking device.

Accordingly, it is an object of the present invention to provide a separation mechanism which avoids, by simple means, shortcomings and disadvantages encountered in the prior art.

Another object of the present invention resides in providing a separation mechanism for detaching an aerodynamic braking device from a load which automatically becomes effective upon a touchdown of the cargo or load on the ground.

Yet another object of the present invention resides in providing a separation mechanism for releasing an aerodynamic braking device from a load which insures the exclusion of premature release of the aerodynamic braking device.

A further object of the present invention resides in providing a separation mechanism for releasing an aerodynamic braking device from a load which is maximally simple and compact in construction.

A still further object of the present invention resides in providing a separation mechanism for releasing an aerodynamic braking device from a load which functions reliably under all operating conditions.

Another object of the present invention resides in providing a separation mechanism for releasing an aerodynamic braking device from a load which remains preserved until the suspension elements are relieved of stresses.

A still further object of the present invention resides in providing a separation mechanism for releasing an aerodynamic braking device from a load which opens only upon contact with the ground and only then releases at least one of the suspension elements.

These and other objects, features, and advantages of the present invention will become more apparent from the following description when taken in connection with the accompanying drawings which show, for the purposes of illustration only, several embodiments in accordance with the present invention, and wherein:

FIG. 1c is a top view of a U-shaped locking element which may be used with the separation mechanism of FIG. 1a;

FIG. 3b is a top view of a locking element of the mechanism of FIG. 3a;

FIG. 5b is a rear elevational view of the separation mechanism of FIG. 5a;

Figure 1A:
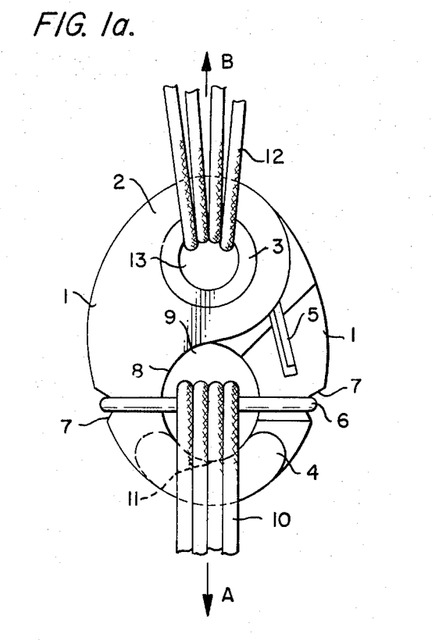
FIG. 1a is an elevational view, on an enlarged scale, of a separation mechanism in accordance with the present invention, prior to being stressed.

Referring now to the drawings wherein like reference numerals are used throughout the various views to designate like parts and, more particularly, to FIG. 1a, according to this figure, a separation mechanism includes two holding members 1, each of which are fashioned as mutually contacting claws of identical shape. A connecting member 3, fashioned as a bushing and serving simultaneously as a common axis of rotation, is provided at the upper ends 2 of the holding members 1 for joining the holding members 1 together. Lower overlapping free ends 4 of the two holding members 1 are fashioned so as to curve upwardly in the manner of a circular arc. A spring element 5 is arranged between the two holding members and, in the illustrated embodiment, the spring element is constructed as a torsion spring of which only one leg is shown in the drawing. The spring element 5 is inserted under a pretension so as to effect a spreading of the holding members 1 after an unlocking and relief.

The holding members 1 are held together, against the force of the spring element 5 by way of a locking means 6 which, in the illustrated embodiment of FIG. 1a is constructed as a rectangular clamping frame which shape-matingly engages lateral notch-like recesses 7 of the holding members 1. The clamping frame or bracket of the locking means 6 may also be U-shaped as frame 6e shown in FIG. 1c.

In the construction of FIG. 1a, as well as in the other embodiments of the present invention, the holding members 1 may be produced in a simple manner by, for example, injection molding or press forming processes from a metal such as, for example, an aluminum alloy. However, it is also possible to produce the holding members 1 from a synthetic resinous material such as polyurethane or polycarbonate. As can readily be appreciated, corresponding considerations also apply with regard to the production of the locking elements of the respective embodiments of the present invention.

In the closed position of the separation mechanism illustrated in FIG. 1a, the holding members 1 form an enclosure 8 of an opening 9 of the system which enclosure 8 is continuous along the entire periphery of the opening 9. A suspension element 10 to be released, in the illustrated embodiment being depicted as several suspension lines of a load (not shown), is extended through the opening 9 with the suspension 10 resting on the locking element 6 which is arranged at a spacing from a lowermost point 11 of the enclosure 8. The suspension element 12 of a braking device, which in the illustrated embodiment is depicted as rigging lines of a parachute (not shown) is extended through the bore 13 of the connecting member 3. As can be appreciated, with the construction illustrated in FIG. 1a, the suspension element 12 of the braking device is not adapted to be released from the separating mechanism.

FIG. 1a provides an example of the condition of the separating mechanism prior to use, that is, for example, during storage. When the braking device is deployed after dropping the load such as cargo from an aircraft, the suspension elements 10, 12 are tensioned against each other by tensile forces in correspondence with the arrows designated A and B due to the shock-like stress which occurs. During this process, the locking element 6 is pulled downwardly and the suspension element 10 of the load is pulled until it contacts the lowermost point 11 of the enclosure 8 whereby a shape-mating locking of the two holding members is effected until relief in the tension occurs. The biasing force of the spring element 5 is insufficient to spread the holding members 1 apart against the load effective on the suspension element 10. Consequently, the spring element 5 does not provide a sufficient biasing force for opening of the closed system.

Upon a touchdown of the cargo on the ground, the suspension element 10 is immediately relieved of tension so that the spring element 5 can effect a simultaneous spreading apart of the two holding members 1 about the pivot axis defined by the connecting member 3. Thus, the system is opened in its lower zone and, consequently, the suspension element 10 to be released may fall out in a downward direction so that the braking device is automatically released from the load or cargo.

Figure 1B:
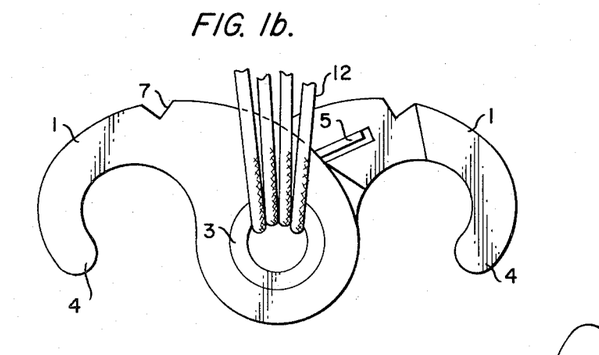
FIG. 1b is an elevational view of a separation mechanism of FIG. 1a in an open or relieved position after release from the load.
Figure 1C:
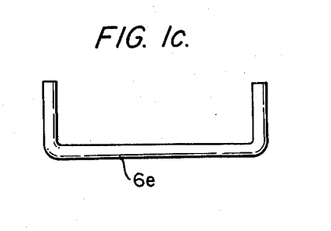

As shown in FIG. 1b, in the open position of the separation mechanism, the braking device such as a parachute is initially still elongated, supported by the effects of wind so that a slight drifting of the braking device takes place under normal circumstances, thereby enabling the braking device to fall to the ground beside the load or cargo.

Figure 2A:
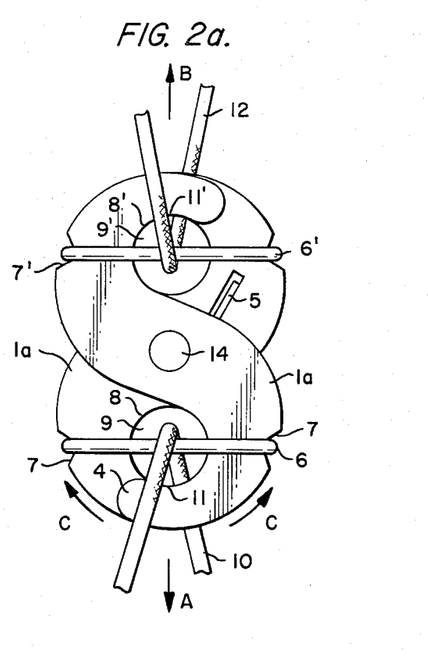
FIG. 2a is an elevational view, on an enlarged scale, of another embodiment of a separation mechanism in accordance with the present invention for releasing a load and a braking device.
Figure 2B:
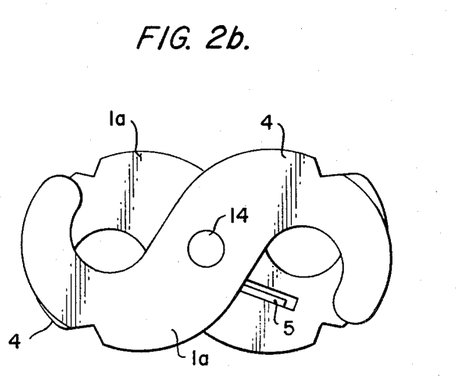
FIG. 2b is an elevational view of a separation mechanism of FIG. 2a with the locking elements removed.

FIGS. 2a and 2b provide an example of a separation mechanism for releasing both the load and braking device. More particularly, as shown in FIG. 2a, the separation mechanism includes two holding members 1a which are fashioned so as to be S-shaped and are adapted to pivot around a common central pivot axle 14 in the directions indicated by the arrows C against each other into an open position shown in FIG. 2b.

In the illustrated embodiment of FIGS. 2a and 2b, the cargo lines or rigging lines are, for the sake of clarity, merely illustrated as single lines and, as with the suspension mechanism of FIG. 1a, the suspension element 10 is extended through the opening 9 with the enclosure 8 being closed along its entire periphery. The suspension element 10 rests on the frame-like locking element 6. Due to the S-shaped configuration of the holding members 1a, a second opening 9' and further enclosure 8' are produced with the enclosure 8' also being continuous along its entire periphery. The suspension element 12 of the braking device is extended through the second opening 9' of the closed system and rests on a second frame-like locking element 6' arranged at a spacing from an uppermost point 11' of the enclosure 8'. As with the frame-like locking element 6, the frame-like locking element 6' is displaceable under a tensile action of the suspension elements 10, 12 relative to the system openings 9, 9' and thus can be pulled off of the holding members 1a. While two frame-like locking elements are illustrated, it would also be possible, by a proper dimensioning of the locking element, to provide either the locking element 6 or the locking element 6'.

After stressing, unlocking, and temporary locking in the closed position have taken place in an analogous manner to that of FIG. 1a, the separation mechanism of FIGS. 2a, 2b assumes, when relieved, under the bias effect of the spring element 5, the open position shown in FIG. 2b in which both the suspension elements 10 and 12 are released, that is, the separation mechanism is disengaged from the cargo or load as well as from the braking device.

Figure 3A:
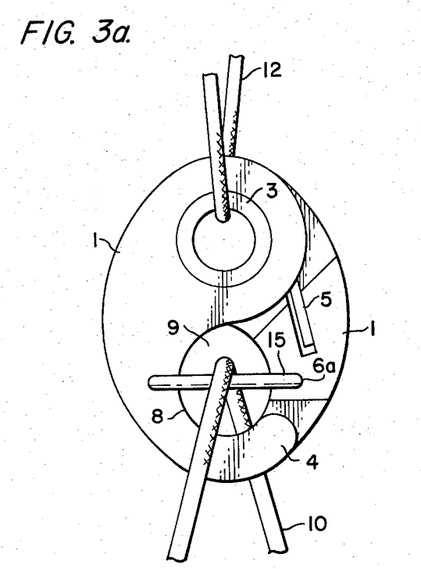
FIG. 3a is an elevational view of another separation mechanism in accordance with the present invention.
Figure 3B:
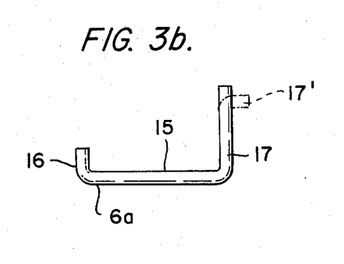
Figure 3C:
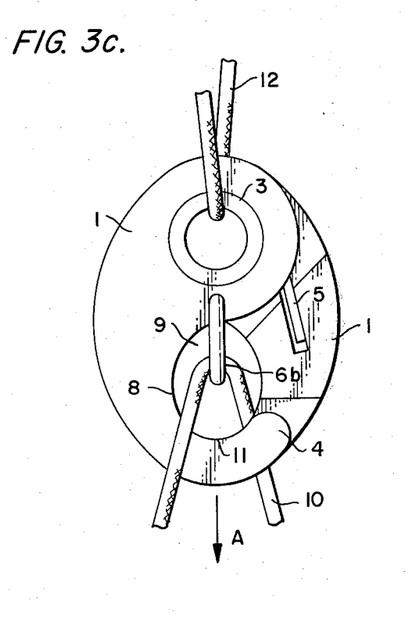
FIG. 3c is an elevational view of another separation mechanism in accordance with the present invention.
Figure 3D:
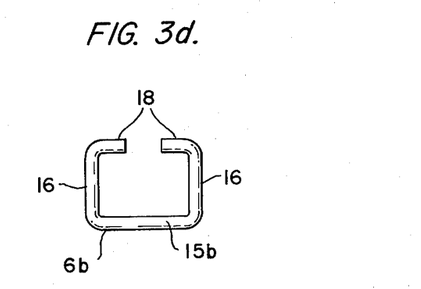
FIG. 3d is a top view of a locking element of the separation mechanism of FIG. 3c.
Figure 3E:
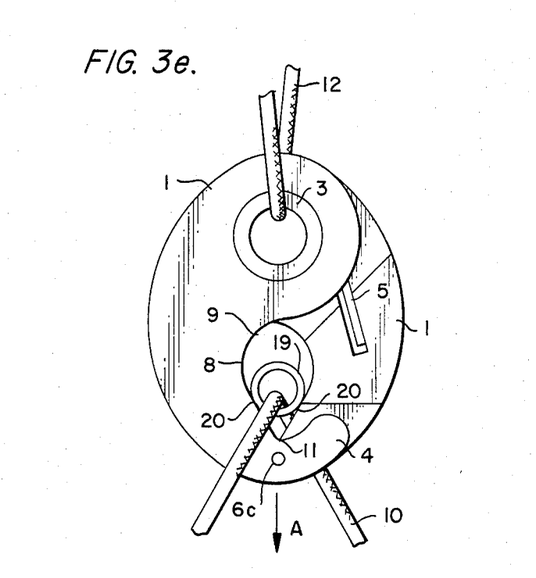
FIG. 3e is an elevational view of yet a further embodiment of a separation mechanism in accordance with the present invention.

The separation mechanisms illustrated in FIGS. 3a, 3c, and 3e essentially correspond to that illustrated in FIG. 1a with the exception of the configuration of the respective locking elements. As shown in FIGS. 3a and 3b, a locking means 6a may be provided and constructed as a clip-type clamp adapted to span, by way of a base 15, the closed opening 9 with legs 16, 17 of the locking means 6, which legs are of unequal length, being respectively inserted into bores provided in the two holding members 1. As shown in phantom lines in FIG. 3b, after assembly, the longer leg 17 is bent at its outer end 17' which projects from the holding member 1 in order to provide for an additional fixation of the locking means 6a.

In FIGS. 3c and 3d, a locking means 6b is provided which is again constructed as a clamp; however, the clamp-shaped locking means 6b does not extend with its base 15b over the opening 9 but merely extends into the opening so that the suspension element 10 can engage the clamp-shaped locking means 6b and pull the locking means 6b, under tensile stress, off the holding members 1. The suspension element 10 again comes in contact with the lowermost point 11 of the opening 9 and thereby locking the overlapping free ends 4 of the holding members 1 in a shape-mating manner. As apparent from FIG. 3c, the free ends of the holding members 1 are curved in an upward direction, that is, in opposition to the pulling direction A of the suspension element 10.

As shown in FIG. 3d, the locking means 6b includes two legs 16, the free ends of which are provided with extensions 18 bent at a right angle toward the inside such that the free ends of the extensions 18 are disposed in opposition to each other. The extensions 18 are provided so as to enable the locking means 6 to engage, from the outside, into corresponding bores provided in the holding members 1 with a press fit thereby locking the holding members 1 in a closed position against the force of the biased spring element 5.

As shown in FIG. 3e, a locking means 6c is provided which is constructed as a shear pin urged into the overlapping curved free ends 4 of the holding members 1 so as to lock the holding members 1 in a shape-mating fashion. The suspension element 10 is extended through a dimensionally rigid thrust ring 19 in the opening 9 and held at a spacing from the lowest point 11 of the opening 9. Under the pulling or tensile force A effective in case of stress on the suspension element 10, the thrust ring 19 is pulled toward the lowest point 11 of the opening 9. The enclosure 8 of the opening 9 tapers in a downward direction in the manner of a wedge so that the thrust ring 19 sliding along the inclined flanks 20 of the holding members 1 slightly urges the holding members 1 apart and thereby effects a shearing of the pin 6.

Figure 4:
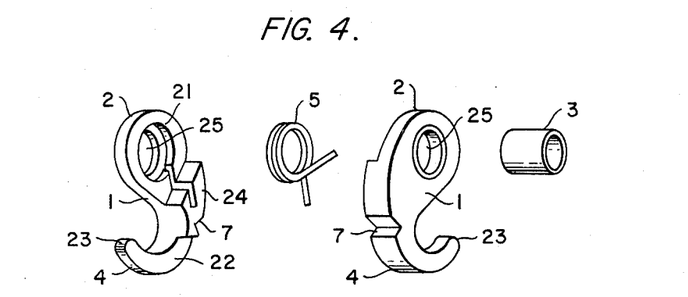
FIG. 4 is an exploded view illustrating the details of the individual elements of the separation mechanism in accordance with the present invention.

FIG. 4 provides an example of the constructional features of the individual parts of the separation mechanism of the present invention, on a natural scale, prior to assembly of the separation mechanism. As shown most clearly in this figure, the two holding members 1 are of an identical shape and on a side of the holding member 1 which is to face the respective other holding member 1, the holding members 1 are provided with a cutout 21 for accommodating the biased spring element 5 in a zone of the upper ends 2 of the holding members 1. The lower free ends 4 of the holding members 1 are provided with a bevel 22 on the same side in the overlapping zone so that the thickness of the free ends 4 steadily decreases up to the outermost rim 23 whereby an undesired thickening in the overlapping region is avoided when the separation mechanism is assembled.

The biased spring element 5, the legs of which engage in slots 24, is interposed between the holding members 1 and, after the two holding members 1 are put together, the connecting member 3 formed, for example, as a bushing, is passed through the axial bores 25. The connecting member 3 is forced against the holding members 1 by two rims or is flanged thereto or the like so that the holding members 1 are, on the one hand, firmly joined together but, on the other hand, can also be readily spread apart after unlocking and relief from the load. The lateral recesses 7 provided on the holding member 1 enable a snap connection of the locking means as shown most clearly in FIGS. 1a and 2a. The lateral recesses 7 have an approximately triangular cross-sectional configuration.

Figure 5A:
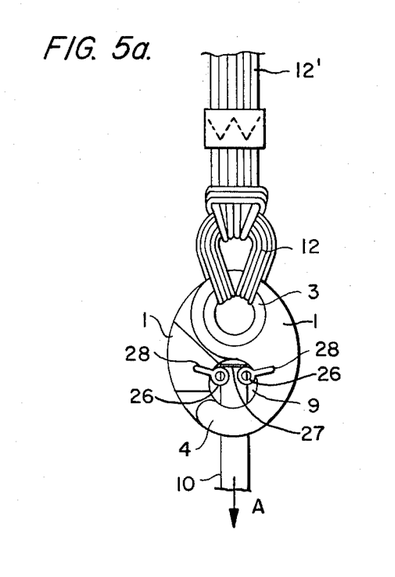
FIG. 5a is a front elevational view of a separation mechanism in accordance with the present invention using a rip cord locking means.
Figure 5B:
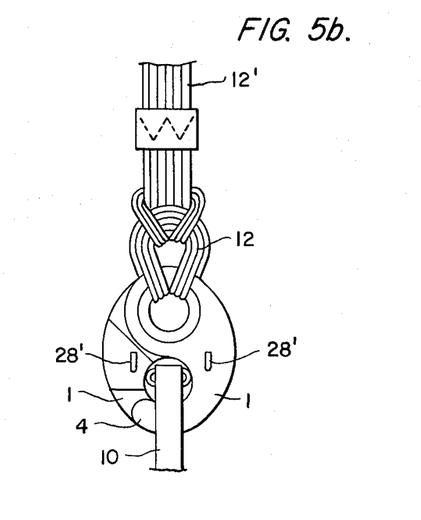

FIGS. 5a and 5b provide an illustration of a further separation mechanism on a natural scale wherein the locking together of the two holding members 1 takes place by means of extensions 26 which project into the opening 9. In the arrangement of FIGS. 5a and 5b, extension 26 are fashioned as eyes made of metallic wire or the like. The eyes opposing each other in the opening 9 at a small spacing are connected by means of at least one rip cord 27 of a predetermined strength with the rip cord being made of natural fibers, synthetic fibers, or the like so that a locking action is provided. The suspension element 10, fashioned as a flexible strip, is adapted to rest on the rip cord 27.

Under a tensile force A, the suspension element 10 effects a severing of the rip cord 27 and thus enables an unlocking of the separating mechanism, thereby enabling the suspension element to contact the lowermost point 11 of the opening 9 so as to continue to maintain the holding of the holding members 1 in a closed position until a relief from the load occurs. The eyes 26 are passed with their ends 28 through corresponding bores of the holding members 1 preferably with a press fit and are additionally urged against the holding members 1 on the other side with their projecting sections 28' as shown most clearly in FIG. 5b. The suspension element 12 for the braking device is fashioned as a loop to which are connected, in turn, rigging lines 12' of, for example, a parachute.

Figures 6A, 6B:
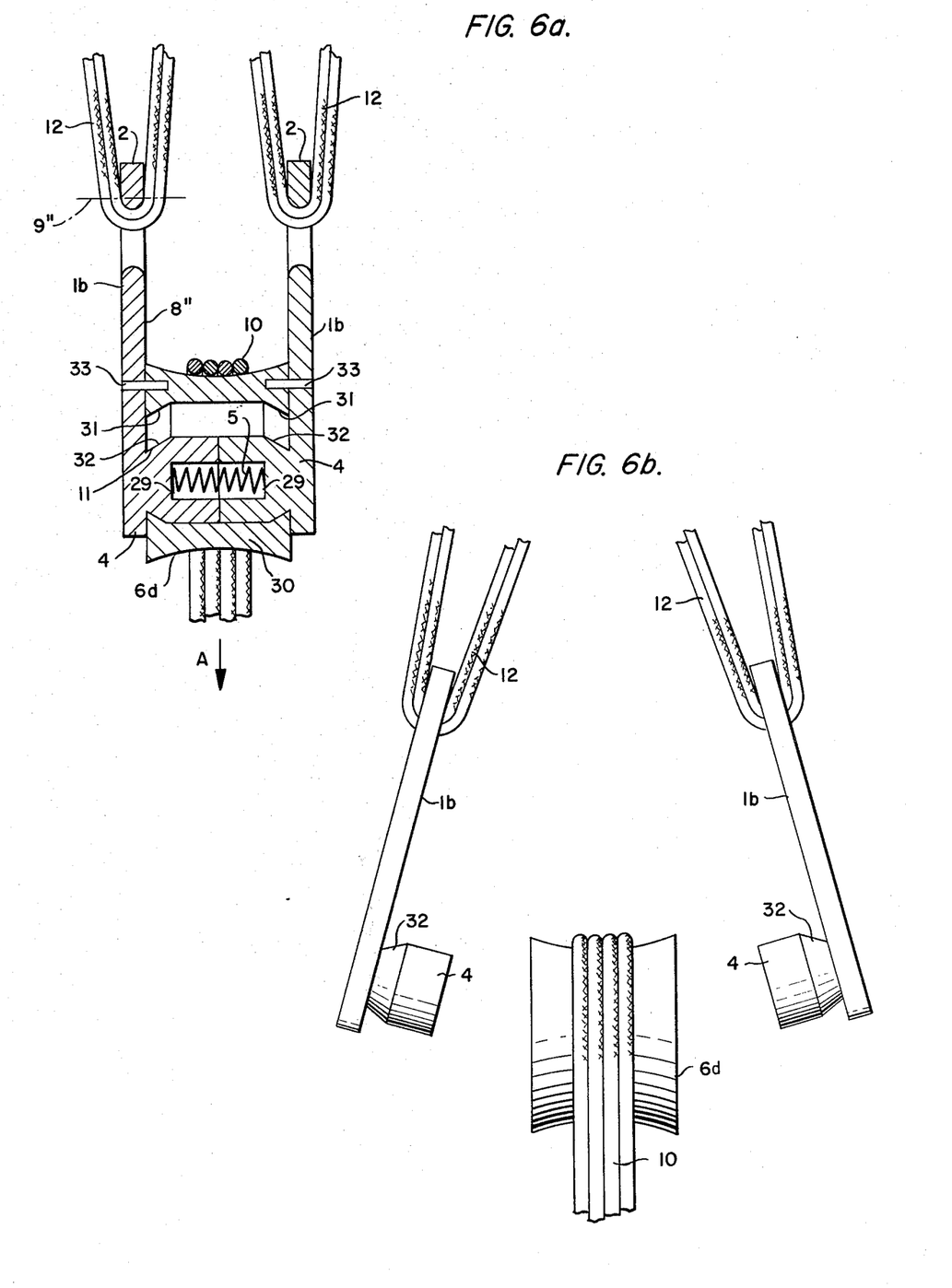
FIG. 6a is a cross-sectional view of yet another separation mechanism in accordance with the present invention prior to being stressed.
FIG. 6b is a side view of the separation mechanism of FIG. 6a after a release from a load.

In FIG. 6a, a separation mechanism is provided which includes two identical holding members 1b, each of which is connected at an upper end 2 with at least one suspension element 12 of a braking device (not shown). In the illustrated embodiment, half the number of the rigging lines of a parachute are arranged at the upper ends 2 of the holding members 1b so that the holding members 1b abut at their lower ends 4. An enclosure 8" of an opening 9" is formed by the suspension elements 12 disposed at the respective holding members 1b and the braking device (not shown) connecting these suspension elements 12 with one another with the enclosure 8" being continuous along its entire periphery.

Recesses 29, fashioned as blind holes, are formed in the lower ends 4 for accommodating a biased spring element 5 which, in this case, is formed of a compression spring. A locking element 6d is fashioned as a sleeve 30 provided with internal conical surfaces 31 which, in the illustrated first position of the locking element 6d, shape-matingly contact corresponding conical counter surfaces 32 of the lower ends 4. An upper portion of the sleeve 30 is located at a spacing from the lowest point 11 of the opening 9'', that is, the lower ends 4 so that here again, the sleeve 30 can be displaced by a predetermined distance with respect to the holding members 1 for the purpose of unlocking the separating mechanism. The locking element 6d is held in its first position by the two shear pins 33. The suspension element 10 of the cargo or load to be released is placed around the tubular locking element 6d and thus is extended through the closed opening 9'' of the system. When the braking device is deployed, the shear pins 33 are sheared off under the tensile force acting in the direction of the arrows A and the locking element 6d is pulled downwardly into its second position until it contacts lower ends 4 so that, at this point in time, the upper part of the inner conical surfaces 31 shape-matingly engage the lower ends 4 of the holding members 1b and maintain the lower ends 4 in the closed position under the effect of the load or cargo.

Upon a relief from the load, which occurs when the load or cargo touches the ground, the spring element 5 can then urge the two holding members 1b apart and the conical surfaces 31, 32 of the sleeve 30 and lower ends 4 slide along one another. Thus, the separation mechanism will pass over the open position illustrated in FIG. 6b wherein the suspension element 10 with the locking means 6d has been released and thus separation between the braking devices and load or cargo has been accomplished.

Figure 7A:
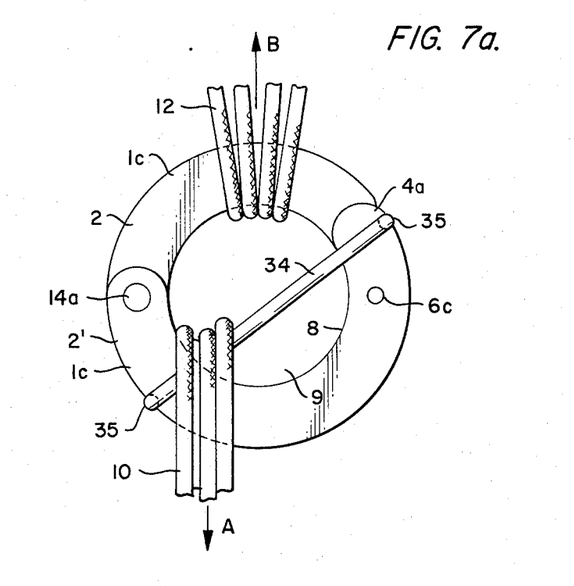
FIG. 7a is an elevational view of a still further separation mechanism in accordance with the present invention prior to being stressed.
Figure 7B:
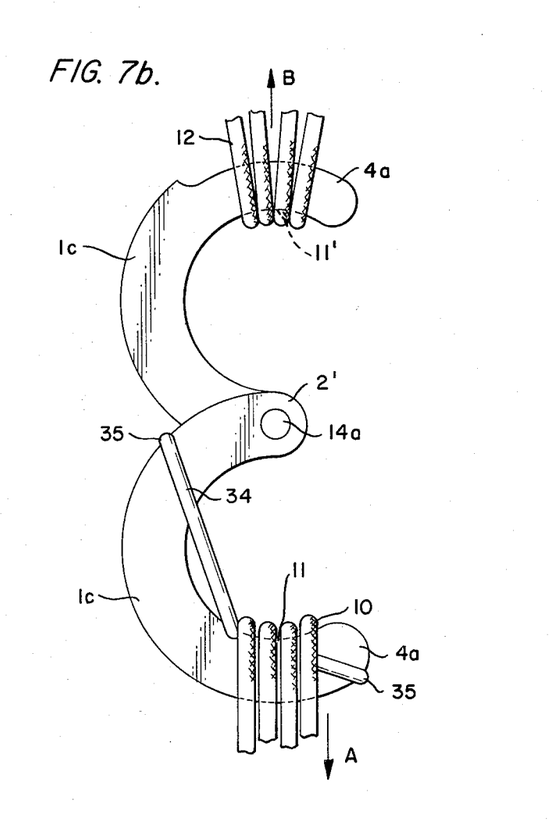
FIG. 7b is an elevational view of the separation mechanism of FIG. 7a during application of stress thereto.

FIGS. 7a and 7b provide an illustration of a separating mechanism wherein two holding members 1c, each having the shape of a circular arc, are joined with one of their ends 2' so that the two holding members 1c are pivotable with respect to each other by way of a pivot axle 14a with the outer free ends 4a of the holding members being adapted to overlap in a closed position of the mechanism. Locking means 6c, fashioned as a shear pin, is arranged diametrically opposite or in horizontal opposition to the pivot axle 14a. The locking means 6c shape-matingly locks the two holding members 1c in their overlapping zone.

As shown in FIG. 7a, the two holding members 1c here again form an enclosure 8 for the opening 9 of the system with the enclosure 8 being continuous along the entire periphery. The suspension elements 10 and 12 of the cargo and braking device (not shown) are extended through the opening 9 of the separation mechanism with the suspension element 10 resting on a spring element 34 formed, for example, as an elastically expandable band, with the band being tensioned in the manner of a cord between notches 35 provided on the lower holding member 1c.

When the suspension elements 10 and 12 are stressed during operation by tensile forces acting in the direction of the arrows A, B, the locking means 6c is severed so that the system passes over from the closed position shown in FIG. 7a into the open position shown in FIG. 7b wherein the enclosure 8 is interrupted along part of its periphery. The tensile forces acting in the direction of the arrows A, B, are still effective on the suspension elements 10, 12 whereby the spring element 34 is elastically expanded so that the suspension element 10 contacts the area of the lowermost point 11 of the inner rim pertaining to the lower holding member 1c. Correspondingly, the suspension element 12 contacts in the zone of the uppermost point 11' of the inner rim pertaining to the upper holding member 1c.

For this purpose, the holding members 1c are again fashioned so as to be curved at their respective free ends 4a with the curving being in opposition to the pulling directions or tensile forces designated by the arrows A, B so as to exclude an undesirable sliding off of the suspension elements 10, 12 from the holding members 1c under stress. The separation mechanism then acts along the lines of a double hook and, when stress on the suspension element 10 is relieved, the spring element 34 returns to its original position and, during this returning process, strips the suspension element 10 off the lower holding member 1c whereby, in turn, the braking device is then detached from the cargo or load.

While we have shown and described several embodiments in accordance with the present invention, it is understood that the same is not limited thereto, but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A separation mechanism for detaching an aerodynamic braking device from a load, the separation mechanism being adapted to be connected to at least one suspension element of the braking device and of the load and being adapted to automatically release at least one of the suspension elements upon a relief of a load thereon, characterized in that the separation mechanism is constructed as a closed system and includes at least two holding members, means are provided for connecting the two holding members to each other so as to enable relative movement therebetween, said holding members are arranged so as to form at least part of an enclosure which is closed along its entire periphery so as to define an opening for accommodating the at least one suspension element to be automatically released, means are provided for locking the holding members in a closed position defining the opening, said locking means are adapted to be released by a stress exerted on the suspension element, and in that, said holding members are constructed so that, even after a release of the locking means, the at least one suspension element to be released is held under a stress of at least one of the holding members and can be released only after a relief of such stress, and wherein the holding members are held in the closed position by a stress applied by the suspension element after a release of the locking means and the holding members move relative to each other into an open position only upon relief of the stress with the relative movement of the holding members resulting in an interruption in the enclosure of the opening along a portion of the periphery of such enclosure thereby enabling the at least one suspension element to be released, and wherein said connecting means includes a common pivot means for mounting the two holding members so as to be pivotable with respect to each other, and in that the holding members together form the entire enclosure closed along its entire periphery defining the opening for accommodating the at least one suspension element to be released, the common pivot means including an opening for accommodating the suspension element which is not to be released.

2. A separation mechanism according to claim 1, characterized in that the common pivot means is fashioned as one of an eyelet and a bushing which connect the two holding members with each other.

3. A separation mechanism according to claim 2, characterized in that the two holding members have an identical configuration.

4. A separation mechanism for detaching an aerodynamic braking device from a load, the separation mechanism being adapted to be connected to at least one suspension element of the braking device and of the load and being adapted to automatically release at least one of the suspension elements upon a relief of a load thereon, characterized in that the separation mechanism is constructed as a closed system and includes at least two holding members, means are provided for connecting the two holding members to each other so as to enable relative movement therebetween, said holding members are arranged so as to form at least part of an enclosure which is closed along its entire periphery so as to define an opening for accommodating the at least one suspension element to be automatically released, means are provided for locking the holding members in a closed position defining the opening, said locking means are adapted to be released by a stress exerted on the suspension element, and in that, said holding members are constructed so that, even after a release of the locking means, the at least one suspension element to be released is held under a stress of at least one of the holding members and can be released only after a relief of such stress, wherein the holding members are held in the closed position by a stress applied by the suspension element after a release of the locking means and the holding members move relative to each other into an open position only upon relief of the stress with the relative movement of the holding members resulting in an interruption in the enclosure of the opening along a portion of the periphery of such enclosure thereby enabling the at least one suspension element to be released, and wherein said connecting means includes a common pivot means for mounting the two holding members so as to be pivotable with respect to each other, and in that each of the holding members has a configuration so as to define one opening between them on both sides of the common pivot means with each of the openings forming an enclosure continuous along an entire periphery thereof.

5. A separation mechanism according to claim 4, characterized in that the means for locking the two holding members includes at least one locking element, and in that the at least one suspension element to be released is arranged at the holding members and the locking element in such a manner that, upon an application of a tensile stress on the at least one suspension element to be released, said last-mentioned suspension element is displaced by a predetermined distance relative to the holding members so as to effect at least one of a severing of the locking element and a detachment of the at least one locking element from the holding members.

6. A separation mechanism according to claim 5, characterized in that the locking element is disposed at least in part in the opening defined by the holding members, and in that the at least one suspension element to be released is extended around the locking element so that the at least one suspension element is capable of being displaced with the locking element upon an application of tensile stress within the opening by the at least one suspension element.

7. A separation mechanism according to claim 6, characterized in that the locking element is constructed as a substantially U-shaped clamping bracket, each of the two holding members is provided with lateral recesses for engagingly accommodating respective legs of the U-shaped clamping bracket, the lateral recesses on the holding members are arranged so that the clamping bracket spans the opening defined by the holding members, and in that the U-shaped bracket is adapted to be one of separated and detached by an application of stress thereto by the at least one suspension element to be released.

8. A separation mechanism according to claim 6, characterized in that the locking element includes a rip cord means.

9. A separation mechanism according to claim 8, characterized in that the locking means further includes a pair of eye means for locking the holding members together, each of said eye means includes a projection projecting into the opening of the closed system and an end portion accommodated in a bore of the respective holding members.

10. A separation mechanism according to claim 9, characterized in that the projecting means are fashioned as wire eyelets connected to the respective holding members.

11. A separation mechanism according to claim 10, characterized in that the two holding members have an identical configuration.

12. A separation mechanism for detaching an aerodynamic braking device from a load, the separation mechanism being adapted to be connected to at least one suspension element of the braking device and of the load and being adapted to automatically release at least one of the suspension elements upon a relief of a load thereon, characterized in that the separation mechanism is constructed as a closed system and includes at least two holding members, means are provided for connecting the two holding members to each other so as to enable relative movement therebetween, said holding members are arranged so as to form at least part of an enclosure which is closed along its entire periphery so as to define an opening for accommodating the at least one suspension element to be automatically released, means are provided for locking the holding members in a closed position defining the opening, said locking means are adapted to be released by a stress exerted on the suspension element, and in that, said holding members are constructed so that, even after a release of the locking means, the at least one suspension element to be released is held under a stress of at least one of the holding members and can be released only after a relief of such stress, wherein the holding members are held in the closed position by a stress applied by the suspension element after a release of the locking means and the holding members move relative to each other into an open position only upon relief of the stress with the relative movement of the holding members resulting in an interruption in the enclosure of the opening along a portion of the periphery of such enclosure thereby enabling the at least one suspension element to be released, and wherein in the closed position of the holding members, one of the suspension elements forms at least a part of the enclosure which is continuous along the entire periphery and through which the at least one suspension element to be released is extended.

13. A separation mechanism according to claim 12, characterized in that the locking means includes at least one locking element for maintaining the two holding members in the closed position, the at least one locking element being movable from a first to a second position under a tensile stress of the at least one suspension element to be released, and in that the locking element in the first position contacts respective free ends of the holding members and retains the holding members in the closed position against a force tending to urge the holding members apart until the tensile stress of the at least one suspension element to be released has been relieved.

14. A separation mechanism according to claim 13, characterized in that the at least one locking element is constructed as a sleeve extending over the respective free ends of the holding members for maintaining the holding members in the closed position even in the first position of the locking element.

15. A separation mechanism according to claim 14, characterized in that surfaces of the locking element and of the free ends of the holding members which are brought into contact have at least one of a curved and inclined portion at least over a partial area thereof so that a shape-mating connection is established in a direction of the force tending to urge the holding members apart, and in that the shape-mating connection is adapted to be released in the second position of the locking element upon a relief of the tensile stress of the at least one suspension element to be released by the force tending to urge the holding members apart.

16. A separation mechanism according to claim 15, characterized in that the two holding members have an identical configuration.

17. A separation mechanism for detaching an aerodynamic braking device from a load, the separation mechanism being adapted to be connected to at least one suspension element of the braking device and of the load and being adapted to automatically release at least one of the suspension elements upon a relief of a load thereon, characterized in that the separation mechanism is constructed as a closed system and includes at least two holding members, means are provided for connecting the two holding members to each other so as to enable relative movement therebetween, said holding members are arranged so as to form at least part of an enclosure which is closed along its entire periphery so as to define an opening for accommodating the at least one suspension element to be automatically released, means are provided for locking the holding members in a closed position defining the opening, said locking means are adapted to be released by a stress exerted on the suspension element, and in that, said holding members are constructed so that, even after a release of the locking means, the at least one suspension element to be released is held under stress of at least one of the holding members and can be released only after a relief of such stress, and wherein at least one of the holding members is under a stress of the at least one suspension element to be released, said last-mentioned holding member being adapted to be displaced to a position upon a release of the locking means so as to interrupt the enclosure along a portion of the periphery thereof, said last-mentioned holding member including a free end around which the suspension element to be released is extended, the free end of said last-mentioned holding member having a configuration such that the free end absorbs the tensile force exerted by the at least one suspension element to be released when a stress is exerted thereon, and in that means are provided for displacing the at least one suspension element to be released relative to the last-mentioned holding member so as to separate the at least one suspension element therefrom upon a relief of the stress on such suspension element.

18. A separation mechanism according to claim 17, characterized in that the two holding members have a curved configuration, said connecting means includes a common pivot means arranged at a first end of each of the holding members such that second ends of the holding members overlap in the closed position thereby forming the enclosure which is continuous along the entire periphery thereof.

19. A separation mechanism according to claim 18, characterized in that the locking means are provided in an area of the overlapping ends of the holding members.

20. A separation mechanism according to claim 19, characterized in that the common pivot means and locking means are arranged at least approximately diametrically opposite each other.

21. A separation mechanism according to one of claims 19 or 20, characterized in that the displacing means includes an elastically deformable holding means connecting two points of one of the holding members in the manner of a cord, and in that the elastically deformable holding means are deformable by stress on the suspension element to be released such that, upon relief of the stress, the elastically deformable holding means effects a stripping off of the suspension element to be released from the associated holding member.

22. A separation mechanism according to claim 21, characterized in that a free end of each of the holding members is curved in a direction opposite a pulling direction of the suspension elements.

23. A separation mechanism for detaching an aerodynamic braking device from a load, the separation mechanism being adapted to be connected to at least one suspension element of the braking device and of the load and being adapted to automatically release at least one of the suspension elements upon a relief of a load thereon, characterized in that the separation mechanism is constructed as a closed system and includes at least two holding members, means are provided for connecting the two holding members to each other so as to enable relative movement therebetween, said holding members are arranged so as to form at least part of an enclosure which is closed along its entire periphery so as to define an opening for accommodating the at least one suspension element to be automatically released, means are provided for locking the holding members in a closed position defining the opening, said locking means are adapted to be released by a stress exerted on the suspension element, and in that, said holding members are constructed so that, even after a release of the locking means, the at least one suspension element to be released is held under a stress of at least one of the holding members and can be released only after a relief of such stress, and wherein the means for locking the two holding members includes at least one locking element, and in that the at least one suspension element to be released is arranged at the holding members and the locking element in such a manner that, upon an application of a tensile stress on the at least one suspension element to be released, such suspension element is displaced by a predetermined distance relative to the holding members so as to effect at least one of a severing of the locking element and a detachment of the at least one locking element from the holding members.

24. A separation mechanism according to claim 23, characterized in that the locking element is disposed at least in part in the opening defined by the holding members, and in that the at least one suspension element to be released is extended around the locking element so that the at least one suspension element is capable of being displaced with the locking element upon an application of tensile stress within the opening by the at least one suspension element.

25. A separation mechanism according to claim 24, characterized in that the locking element is constructed as a substantially U-shaped clamping bracket, each of the two holding members is provided with lateral recesses for engagingly accommodating respective legs of the U-shaped clamping bracket, the lateral recesses on the holding members are arranged so that the clamping bracket spans the opening defined by the holding members, and in that the U-shaped bracket is adapted to be one of separated and detached by an application of stress thereto by the at least one suspension element to be released.

26. A separation mechanism according to claim 24, characterized in that the locking element includes a rip cord means.

27. A separation mechanism according to claim 26, characterized in that the locking means further includes a pair of eye means for locking the holding members together, each of said eye means includes a projection projecting into the opening of the closed system and an end portion accommodated in a bore of the respective holding members.

28. A separation mechanism according to claim 27, characterized in that the projecting means are fashioned as wire eyelets connected to the respective holding members.

29. A separation mechanism according to claim 28, characterized in that the two holding members have an identical configuration.

* * * * *